UNITED STATES PATENT OFFICE 2,543,957

ORGANIC NITRO DIOL DERIVATIVES AND METAL SALTS THEREOF

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,172

12 Claims. (Cl. 260—500)

This application is a continuation-in-part of our copending application Serial No. 15,264, filed March 16, 1948, now Patent Number 2,483,884, and the invention relates to new chemical compounds and to chemical methods useful for their synthesis. More particularly, the invention relates to certain organic nitro diol derivatives and metal salts thereof and to methods for obtaining these products. The nitro diol compounds of the invention can be represented by the formula,

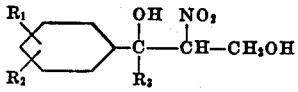

where $R_1$ and $R_2$ are the same or different and represent hydrogen, halogen, lower alkyl or lower alkoxy radicals and $R_3$ is hydrogen or a lower alkyl radical.

Although, as will be appreciated by those skilled in the art, the products of the invention can theoretically exist in both structural and optical isomeric form, they are so unstable or labile with respect to structural and optical form that they exist, for practical purposes, only in the unresolved form. The products produced in accordance with the invention are in the unresolved form and have been represented throughout by the customary structural chemical formulae.

In accordance with the invention, metal salts of nitro diols of the above general formula are produced by condensing a phenyl carbonyl compound of formula,

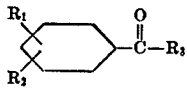

with β-nitroethanol in the presence of an alkaline condensation catalyst, where $R_1$, $R_2$ and $R_3$ have the same significance as given above. Acidification of the metal salts produced by the initial condensation yields the nitro diols.

The condensation between the phenyl carbonyl compound and β-nitroethanol is carried out at a temperature between about 0 and 50° C. and preferably in an anhydrous reaction medium. In general, the preferred solvents for the reaction are substantially anhydrous lower aliphatic alcohols as the products of the invention are much easier to isolate from anhydrous media. As alkaline condensation catalysts, alkali and alkaline earth metal hydroxides, oxides, alkoxides, carbonates and amides may be used. Some specific examples of such alkaline materials are sodium hydroxide, potassium hydroxide, barium hydroxide, lithium hydroxide, potassium carbonate, sodium carbonate, sodium ethylate, potassium ethylate, sodamide, potassium amide, calcium butylate, potassium butylate, calcium oxide, sodium oxide and the like. In general, the quantity of the alkaline condensation catalyst employed is approximately equivalent to the quantity of β-nitroethanol or of the phenyl carbonyl compounds used.

As stated above, the nitro diols of the invention are produced by acidification of a metal salt thereof. In carrying out this acidification care must be taken when a mineral acid is used to avoid an excess of the mineral acid as in the presence of strong acids at a pH below 3 the nitro diols tend to dehydrate to form unsaturated styrene-like products. For this reason the preferred method for converting the metal salts of the nitro diol products to the free nitro diols is to dissolve the salt in a medium consisting essentially of a lower aliphatic acid such as acetic acid, and to carefully and exactly neutralize the salt with mineral acid. The lower aliphatic acid used as the reaction solvent exerts a buffering effect on the reaction due to the fact that a portion of it is converted to the corresponding salt and care must be taken to overcome this buffering action without introducing an excess of the mineral acid.

Some examples of the salts of the nitro diols which can be prepared either directly in the condensation reaction as described above or by reaction with the free nitro diols are the sodium, potassium, lithium, calcium and barium salts. These salts are stable in the anhydrous form but when dissolved in aqueous solvents or in the presence of moisture they tend to decompose into their components, that is, the phenyl carbonyl compound, β-nitroethanol and the hydroxide of the metal present in the salt. In solution at pH values of less than about 5 the salts are converted to the free nitro diols.

The chemical reactions involved in the preparation of the products of the invention may be diagrammatically illustrated as follows:

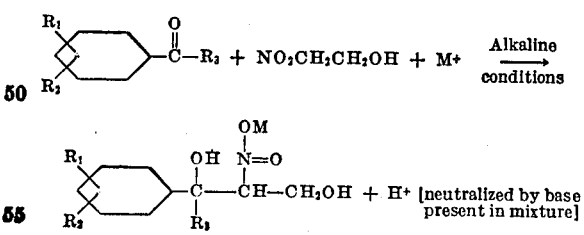

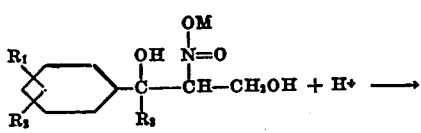

where $R_1$, $R_2$ and $R_3$ have the same significance as given above and M is one equivalent of an alkali or alkaline earth metal.

The nitro diols of the invention and their metal salts are valuable intermediates for the preparation of other organic compounds. They are of particular value in the preparation of organic compounds possessing antibiotic activity.

The invention is illustrated by the following examples.

Example 1

[a] 1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

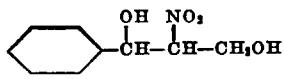

can be obtained by acidification of the salt.

[b] 130 g. of sodium is dissolved in 1400 cc. of cold methanol and the cold solution added with stirring to a solution consisting of 550 g. of crude β-nitroethanol and 600 g. of benzaldehyde in 2300 cc. of methanol at 5° C. The gelatinous precipitate which forms during the initial stages of the reaction is converted to a fine powder by continued stirring. After about one hour the product is separated by filtration, washed with cold methanol and with ether and finally dried in vacuo; yield about 800 g. The product thus obtained is the sodium salt of 1-phenyl-2-nitropropane-1,3-diol of formula,

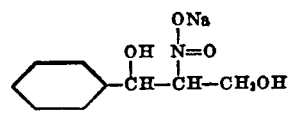

83 cc. of concentrated hydrochloric acid dissolved in 500 cc. of glacial acetic acid is added with stirring to a solution of 220 g. of the sodium salt of 1-phenyl-2-nitropropane-1,3-diol in 500 cc. of glacial acetic acid at 15° C. The precipitated sodium chloride is removed by filtration and the acetic acid evaporated in vacuo to obtain the oily 1-phenyl-2-nitropropane-1,3-diol of formula,

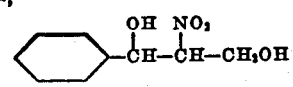

If desired, an equivalent amount of potassium can be substituted for the sodium used in the above procedure. The product thus obtained in the initial condensation is the potassium salt of 1-phenyl-2-nitropropane-1,3-diol.

Example 2

[a] 2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the white insoluble sodium salt of 1-o-methylphenyl-2-nitropropane-1,3-diol removed by filtration, washed with ether and dried. This salt has the formula,

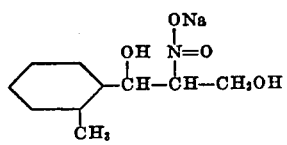

Acidification of this sodium salt produces the corresponding free nitro compound, 1-o-methylphenyl-2-nitropropane-1,3-diol, which has the formula,

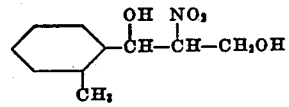

[b] 100 g. of sodium methoxide dissolved in 400 cc. of methanol is added to a solution of 200 g. of β-nitroethanol and 200 g. of o-methylbenzaldehyde in 600 cc. of methanol below 10° C. The mixture is stirred for one hour at 30–45° C., the powdery product collected, washed with dry methanol and dried in vacuo; yield about 250 g. 234 g. of the sodium salt of 1-o-methylphenyl-2-nitropropane-1,3-diol thus obtained is dissolved in 1000 cc. of glacial acetic acid at 15° C. and a cold solution of 28.5 cc. of concentrated sulfuric acid in 500 cc. of glacial acetic acid added slowly with stirring. The sodium sulfate is removed by filtration and the acetic acid distilled in vacuo to obtain the desired 1-o-methylphenyl-2-nitropropane-1,3-diol of formula,

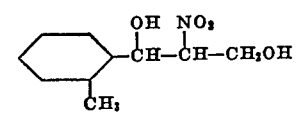

If desired, an equivalent amount of calcium propylate may be used in place of the sodium methoxide employed in the above procedure and the methanol replaced with n-propanol. The condensation product obtained in the case is the calcium salt of 1-o-methylphenyl-2-nitropropane-1,3-diol.

Example 3

A solution of 2.2 g. of sodium in 40 cc. of methanol is added to a solution of 13.6 g. of m-methoxybenzaldehyde and 9 g. of β-nitroethanol in 40 cc. of methanol. The reaction mixture is allowed to stand at room temperature for a short time and then the white, insoluble sodium salt of 1-m-methoxyphenyl-2-nitropropane-1,3-diol of formula,

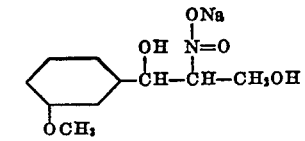

collected. The product is washed with ether and dried. If desired, the free nitro compound, 1-m- methoxyphenyl-2-nitropropane-1,3-diol, having the formula,

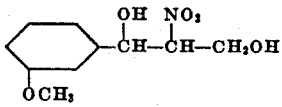

can be obtained by acidification of the salt.

Example 4

2.2 g. of sodium dissolved in 40 cc. of methanol is added to a solution consisting of 13.4 g. of 3,4-dimethylbenzaldehyde and 9 g. of β-nitroethanol in 40 cc. of methanol and the reaction mixture allowed to stand at room temperature until the gel which forms initially is converted to a white insoluble powder. The precipitate which consists of the sodium salt of 1-[3′,4′-dimethylphenyl]-2-nitropropane-1,3-diol is collected, washed with ether and dried. The free nitro compound of formula,

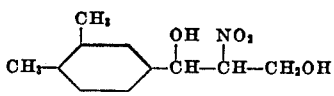

can be obtained by dissolving 18.6 g. of the sodium salt in 100 cc. of glacial acetic acid and adding 6.25 cc. of concentrated hydrochloric acid in 10 cc. of glacial acetic acid, filtering the solution and evaporating the acetic acid in vacuo.

Example 5

A solution of 2.2 g. of sodium in 40 cc. of methanol is added to a solution of 12 g. of acetophenone and 9 g. of β-nitroethanol in 40 cc. of methanol and the mixture allowed to stand at room temperature until the sodium salt of the desired 2-nitro-3-phenylbutane-1,3-diol of formula,

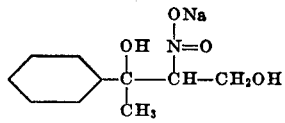

separates from the solution. The salt is collected, washed with ether and dried. If desired, the free nitro compound having the formula,

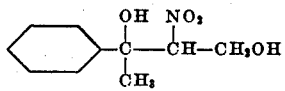

can be obtained by acidification of the salt.

Example 6

2.2 g. of sodium dissolved in about 35 cc. of methanol is added to a solution of 14 g. of o-chlorobenzaldehyde and 9 g. of β-nitroethanol in 40 cc. of methanol. The reaction mixture is allowed to stand at room temperature for a short time and then the white, insoluble, sodium salt of 1-o-chlorophenyl-2-nitropropane-1,3-diol collected. The salt is washed with ether and dried. If desired, the free nitro diol can be obtained by acidification of this salt. The formula of the nitro diol is:

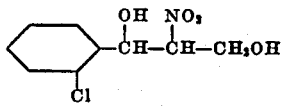

Example 7

26 g. of sodium dissolved in 300 cc. of methanol is added to a solution of 100 g. of β-nitroethanol and 150 g. of p-bromobenzaldehyde in 500 cc. of methanol at 5° C. and the resulting mixture stirred for one hour. The precipitate is collected, washed with methanol and then with ether and finally dried in vacuo. The product thus obtained is the sodium salt of 1-p-bromophenyl-2-nitropropane-1,3-diol of formula,

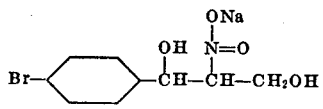

90 g. of the sodium salt of 1-p-bromophenyl-2-nitropropane-1,3-diol is dissolved in 300 cc. of glacial acetic acid and the solution treated with 8.6 cc. of sulfuric acid in 100 cc. of glacial acetic acid. The sodium sulfate is removed by filtration and the acetic acid evaporated in vacuo to obtain the desired 1-bromophenyl-2-nitropropane-1,3-diol of formula,

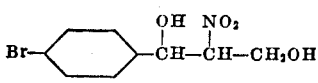

Example 8

16.2 g. of sodium dissolved in 300 cc. of methanol is added to a solution of 96 g. of anisaldehyde and 64.5 g. of β-nitroethanol in 250 cc. of methanol at 10° C. and the resulting mixture stirred for one hour. The white sodium salt of 1-p-methoxyphenyl-2-nitropropane-1,3-diol which separates from the solution is collected, washed with methanol and then with ether and finally dried in vacuo. This product has the formula,

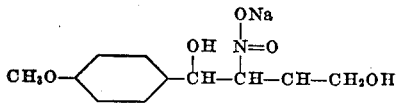

A solution of 25 cc. of concentrated hydrochloric acid in 150 cc. of glacial acetic acid is added slowly to 73 g. of the sodium salt of 1-p-methoxyphenyl-2-nitropropane-1,3-diol in 500 cc. of glacial acetic acid with stirring. The sodium chloride is removed by filtration and the acetic acid distilled in vacuo to obtain the desired 1-p-methoxy-2-nitropropane-1,3-diol of formula,

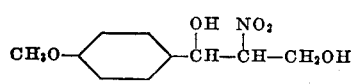

Example 9

A solution of 80 g. of sodium methylate dissolved in 350 cc. of methanol is added to 150 g. of p-methylacetophenone and 150 g. of β-nitroethanol in 600 cc. of methanol at 5° C. and the resulting mixture stirred for one hour. The white sodium salt of 3-p-methyl-2-nitrobutane-1,3-diol is collected, washed with methanol, then with ether and finally dried in vacuo. The formula of this product is:

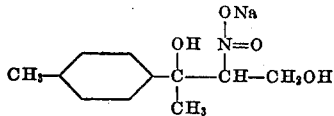

50 cc. of concentrated hydrochloric acid in 200 cc. of glacial acetic acid is added to a cold solution of 150 g. of the sodium salt of 3-p-methylphenyl-2-nitrobutane-1,3-diol in 500 cc. of glacial acetic acid with stirring. The sodium chloride is removed by filtration and the acetic acid evaporated in vacuo to obtain the desired 3-p-methyl-phenyl-2-nitrobutane-1,3-diol of formula,

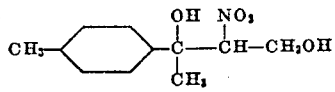

Example 10

45 g. of sodium dissolved in 500 cc. of methanol is added to 200 g. of β-nitroethanol and 300 g. of p-iodobenzaldehyde in 800 cc. of methanol and the resulting mixture stirred at room temperature for one hour. The sodium salt of 1-p-iodophenyl-2-nitropropane-1,3-diol which separates from the solution, is collected, washed with ethanol, then with ether and finally dried under vacuo. The formula of this product is,

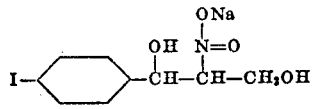

28.5 cc. of sulfuric acid in 500 cc. of glacial acetic acid is added to 362 g. of the sodium salt of 1-p-iodophenyl-2-nitropropane-1,3-diol in 1500 cc. of glacial acetic acid, the sodium sulfate removed by filtration and the acetic acid distilled in vacuo to obtain the desired 1-p-iodophenyl-2-nitropropane-1,3-diol of formula,

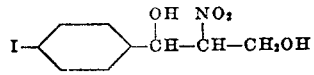

Example 11

100 g. of sodium methoxide in 400 cc. of methanol is added to 180 g. of β-nitroethanol and 225 g. of p-ethoxy-benzaldehyde in 800 cc. of methanol at about 5° C. and the reaction mixture stirred for one hour. The insoluble sodium salt of 1-p-ethoxyphenyl-2-nitropropane-1,3-diol is collected, washed with methanol, then with ether and finally dried in vacuo. The formula of this product is,

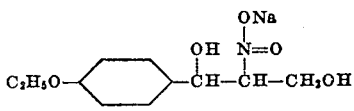

83 cc. of concentrated hydrochloric acid in 500 cc. of glacial acetic acid is added to 256 g. of the sodium salt of 1-p-ethoxyphenyl-2-nitropropane-1,3-diol in 1200 cc. of glacial acetic acid, the sodium chloride removed by filtration and the acetic acid distilled in vacuo to obtain the desired 1-p-ethoxyphenyl-2-nitropropane-1,3-diol of formula,

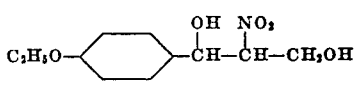

Example 12

63 g. of sodium ethylate in 200 cc. of absolute ethanol is added to 90 g. of β-nitroethanol and 115 g. of m-methoxy-p-methylbenzaldehyde in 500 cc. of ethanol and the resulting mixture stirred for one hour. There results the insoluble sodium salt of 1-m-methoxy-p-methylphenyl-2-nitropropane-1,3-diol of formula,

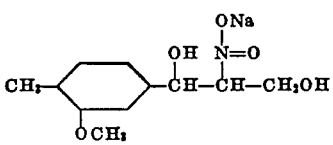

11 cc. of concentrated sulfuric acid in 100 cc. of glacial acetic acid is added to 100 g. of the sodium salt of 1-m-methoxy-p-methylphenyl-2-nitropropane-1,3-diol in 600 cc. of glacial acetic acid with stirring. The sodium sulfate is removed by filtration and the acetic acid evaporated in vacuo to obtain the desired 1-m-methoxy-p-methylphenyl-2-nitropropane-1,3-diol of formula,

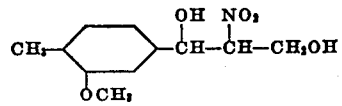

What we claim is:

1. A compound of the class consisting of a nitro diol and metal salts thereof, said nitro diol having the formula,

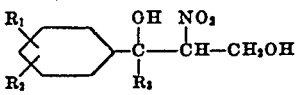

where $R_1$ and $R_2$ are members of the class consisting of hydrogen, halogen, lower alkyl and lower alkoxy radicals and $R_3$ is a member of the class consisting of hydrogen and lower alkyl radicals.

2. A metal salt of 1-phenyl-2-nitropropane-1,3-diol.
3. The sodium salt of 1-phenyl-2-nitropropane-1,3-diol.
4. 1-phenyl-2-nitropropane-1,3-diol.
5. A metal salt of 1-p-methoxyphenyl-2-nitropropane-1,3-diol.
6. The sodium salt of 1-p-methoxyphenyl-2-nitropropane-1,3-diol.
7. Process for obtaining a nitro diol of formula,

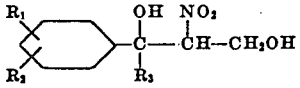

which comprises condensing one mol of a phenyl carbonyl compound of formula,

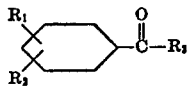

with at least one mol of β-nitroethanol in the presence of at least one mol of an alkaline condensation catalyst thereby obtaining a metal salt of a nitro diol having the formula,

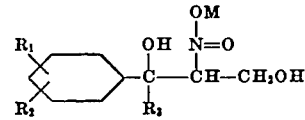

and subsequently acidifying said metal salt; where $R_1$ and $R_2$ are members of the class consisting of hydrogen, halogen, lower alkyl and lower alkoxy radicals, $R_3$ is a member of the class consisting of hydrogen and lower alkyl radicals and M is one equivalent of an alkali or alkaline earth metal.

8. Process for obtaining a salt of a nitro diol of formula,

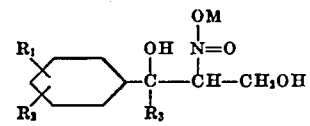

which comprises condensing one mol of a phenyl carbonyl compound of formula,

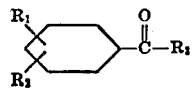

with at least one mol of β-nitroethanol in the presence of at least one mol of an alkaline condensation catalyst; where $R_1$ and $R_2$ are members of the class consisting of hydrogen, halogen, lower alkyl and lower alkoxy radicals, $R_3$ is a member of the class consisting of hydrogen and lower alkyl radicals and M is one equivalent of an alkali or alkaline earth metal.

9. A metal salt of 1-o-methylphenyl-2-nitropropane-1,3-diol.

10. The sodium salt of 1-o-methylphenyl-2-nitropropane-1,3-diol.

11. A metal salt of 1-p-bromophenyl-2-nitropropane-1,3-diol.

12. The sodium salt of 1-p-bromophenyl-2-nitropropane-1,3-diol.

HARRY M. CROOKS, JR.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
| --- | --- | --- |
| 2,139,120 | Hass | Dec. 6, 1938 |
| 2,151,517 | Kamlet | Mar. 21, 1939 |
| 2,231,403 | Wyler | Feb. 11, 1941 |
| 2,460,265 | Tindall | Jan. 25, 1949 |

OTHER REFERENCES

Frieser and Daudt; 41 Chem. Ab., 732–733 (1947).